United States Patent [19]

Nilsson

[11] Patent Number: 4,923,605
[45] Date of Patent: May 8, 1990

[54] FILTER BAG FOR A FILTER SECTION

[76] Inventor: Bjarne Nilsson, Lanterngatan 9,
S-462 00 Vänersborg, Sweden

[21] Appl. No.: 210,441

[22] Filed: Jun. 23, 1988

[30] Foreign Application Priority Data

Jun. 24, 1987 [SE] Sweden .................................. 8702618

[51] Int. Cl.⁵ .............................................. B01D 33/26
[52] U.S. Cl. .................................... 210/232; 210/331;
210/486
[58] Field of Search ............... 210/331, 346, 347, 461,
210/486, 487, 232

[56] References Cited

U.S. PATENT DOCUMENTS 3,369,668  2/1968  Glos, II ................................. 210/486
3,485,376  12/1969  Peterson et al. .................... 210/486
3,971,722  7/1976  Radford .............................. 210/486
4,139,472  2/1979  Simonson ........................... 210/486

FOREIGN PATENT DOCUMENTS 828568  2/1960  United Kingdom .

*Primary Examiner*—Frank Spear
*Attorney, Agent, or Firm*—Pollock, Vande Sande & Priddy

[57] ABSTRACT

A filter bag for a filter section (1) which is one of a plurality of filter sections assembled to an annularly shaped filter disk for a rotating filter. The filter bag is shaped to conform to the configuration of the filter section and is adapted to be pulled over it and to be closed. A strip (9) is fastened in advance to the outlet end (7) of the filter bag and is provided with at least one filtrate outlet opening (10).

9 Claims, 2 Drawing Sheets

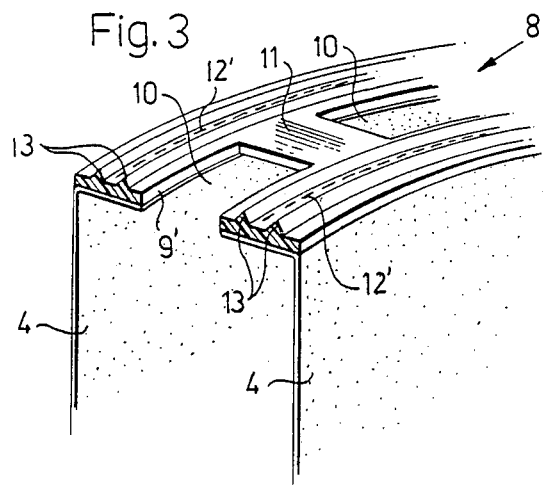
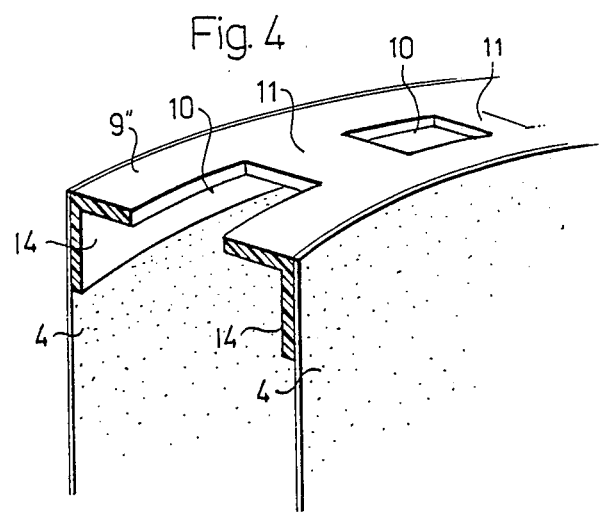

FILTER BAG FOR A FILTER SECTION

FIELD OF THE INVENTION

The present invention relates to a filter bag for a filter section, namely, is one of a plurality of filter sections assembled to an annularly shaped filter disk for a rotating filter, said filter bag being shaped in conformity with the filter section and adapted to be pulled thereover, to be sealed and to be provided with at least one opening at the outlet end of the filter section.

BACKGROUND OF THE INVENTION

It is known from GB-A-828,568 to sew filter bags for filter sections, one or more sides of the bag being provided with a zip fastener for closing the bag when it has been pulled over a filter section. Subsequently, outside the bag, either at the outer or inner periphery thereof, a means closing the corresponding bag end is attached. This means may be a nozzle means. This known construction thus requires mounting work after the bag has been applied onto the section.

In another known construction, employed by the applicant, the filter bag, after having been mounted onto the section, is shrunk with hot steam so that it tightly embraces the section. Thereafter, a nozzle, usually of acid-resisting material, is mounted on the section and a hole is cut in the filter cloth through the filtrate discharge opening or openings of the nozzle.

This method is expensive and laborious, as well as difficult to perform for untrained personnel when exchanging the filter bag, e.g., in a paper mill.

SUMMARY OF THE INVENTION

The object of the invention is a solution to this problem, which has been achieved in that a strip, preferably of plastic, is fastened in advance, preferably sewn, to the nozzle end of the bag, the strip being provided with at least one filtrate outlet opening.

This solution provides several advantages. In the first place, no separate detail need be subsequently mounted. In the case of an expensive acid-resistant nozzle, this involves a significant saving in both material and labor costs. Mounting and changing of filter bags in the industries concerned is considerably simplified and made less expensive; it has already being proven that the need for personnel for mounting and changing filter bags is reduced by one person. Another advantage of the invention is that the strip can be provided with sealings or made integral with such sealings, as required.

BRIEF DESCRIPTION OF THE DRAWINGS

The invention will now be described with reference to the accompanying drawings, in which several embodiments of the invention are shown by way of example, and in which FIGS. 2 to 4 are sectioned perspective views to a larger scale of three different embodiments of a filter bag in accordance with the invention.

DESCRIPTION OF PREFERRED EMBODIMENT

Figure 1:
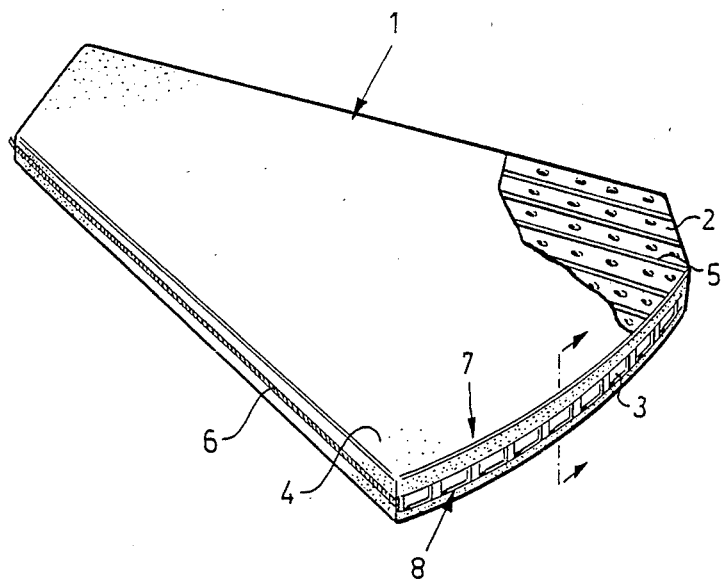
FIG. 1 is a perspective view of a prior art filter section for a rotating filter.

Filter section 1 illustrated in FIG. 1 is of the known type which is intended to be mounted in a filter rotor together with a plurality of other similar sections, there to form an annular filter disk. Several such disks mounted axially one after the other are carried by the same rotor and are partially submerged in a container for the liquid to be filtered, a collection trough for particles, such as cellulose fibers deposited on the filter disks, being inserted through the central opening of the disks.

A filter section 1 usually comprises two more or less perforated, plate-shaped, mutually spaced elements 2 and 3, constituting the body of the section, and a filter means in the form of a filter cloth 4 or the like, which, by e.g., ridges 5 formed in the plate-shaped elements, is kept spaced from the element surfaces. Other embodiments may be used, but lack any real importance for this invention. An advantageous embodiment of the filter means is a bag of filter cloth, which is tailored to fit accurately a given filter section. The filter bag is pulled over the filter body and is sewn together, or it is provided with a zip fastener 6 (FIG. 1), which is closed after fitting the bag onto the filter body, whereafter the filter bag, which is usually made of plastic material, is steam-shrunk to cause it to tightly embrace the filter body. In the known embodiments, a nozzle of acid-resistant material is then mounted in the outlet end 7 of the filter section.

In accordance with the present invention, the filter bag is already provided during its maufacture with a means which replaces the known type of nozzle. Such a means 8 is indicated in FIG. 1 and is shown in more detail in three different embodiments in FIGS. 2, 3 and 4.

Figure 2:
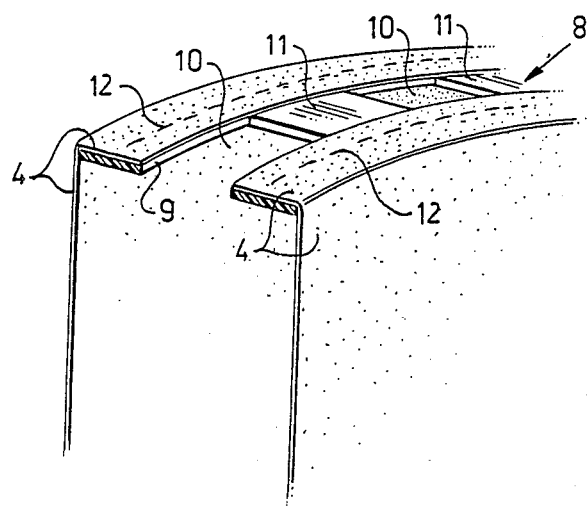

As shown in FIG. 2, a strip 9 is fastened into the nozzle or outlet end of the filter bag, this strip being provided with at least one through flow opening 10 for filtrate, where such is required for use with a given type of filter section body. To keep the filter bag together, the opening or openings 10 are provided with transverse studs 11. Preferably, the strip 9 is made of a relatively rigid but flexible plastics material, e.g., polypropylene, which is sufficiently soft to enable sewing through it. Accordingly, it be preferred that the strip 9 is sewn to the filter bag, although glueing or heat bonding between the materials of strip and filter bag can also be used.

In the embodiment shown in FIG. 2, the filter cloth 4 is located outside the strip 9 and is fastened with stitches 12 through filter cloth and strip. The filter cloth 4 serves here as a seal between the filter section and the connecting means of a filter rotor, where the filter section is to be mounted.

In the embodiment shown in FIG. 3, the strip 9' is located outside the filter cloth 4 and is fastened by stitches 12', which are placed between parallel sealing ribs 13 formed in the material of the strip 9', these ribs being arranged two on either side of the opening or openings 10.

In the embodiment illustrated in FIG. 4, the strip 9" has been provided with long sides 14 and preferably also short sides (unnumbered), i.e., the strip has approximately the configuration of an open box. The filter cloth is here attached to the interior of the sides, but can of course also be attached to their exterior.

Instead of sealing means formed in the material of the strip, separate sealing means in the form of strips, etc. can be mounted outside the filter bag and strip, irrespective of whether the strip is inside or outside the filter bag.

As a result of the invention, the outlet openings need not be made in the filter cloth after mounting the filter bag on a filter body, since these openings are made in the strip. At the same time, a saving in filter cloth material is achieved, since only sufficient filter cloth material required by a working allowance for the stitches is needed at the outlet end of the filter bag, where the strip is mounted.

I claim:

1. A filter bag for a filter section, said filter section having discharge means for filtrate and being one of a plurality of such sections assembled to an annularly shaped filter disk for a rotating filter, said filter bag comprising a flexible filtering medium material and having an outlet and further having a shape in conformity with a shape of said filter section so as to be adapted to be pulled over and fitted onto said filter section, wherein said outlet comprises a strip of a relatively rigid material fastened to said filter bag prior to its being fitted onto said filter section, said strip including a generally flat portion provided with at least one opening located over and communicating with said discharge means when said filter bag is fitted onto said filter section.

2. A filter bag according to claim 1, wherein said generally flat portion comprises two elongated strip portions spaced by at least two spacing means, said elongated strip portions and said at least two spacing means defining said at least one opening.

3. A filter bag according to claim 2, wherein said two elongated strip portions are attached to said flexible filtering medium material in overlapping relationship therewith.

4. A filter bag according to claim 3, wherein said two elongated strip portions are sewn to said relatively flexible filtering medium material.

5. A filter bag according to claim 2, wherein said strip is located outside said relatively flexible filtering medium material.

6. A filter bag according to claim 5, wherein said strip is provided with integral sealing means.

7. A filter bag according to claim 2, wherein said strip is located inside said relatively flexible filtering medium material.

8. A filter bag according to claim 2, wherein each of said two strip portions is provided with an integral web portion, said web portion being attached to said relatively flexible filtering medium material.

9. A filter bag according to claim 1, wherein said strip is made of plastic.

* * * * *